United States Patent [19]

Hammes

[11] E Re. 28,521

[45] Reissued Aug. 19, 1975

[54] CONTAINER CONSTRUCTION

[75] Inventor: Wilhelm Hammes, Much, Germany

[73] Assignee: Mauser Kommanditgesellschaft, Cologne, Germany

[22] Filed: Feb. 25, 1974

[21] Appl. No.: 445,486

Related U.S. Patent Documents

Reissue of:

[64] Patent No.: 3,664,544
Issued: May 23, 1972
Appl. No.: 116,797
Filed: Feb. 19, 1971

[30] Foreign Application Priority Data

Feb. 21, 1970 Germany ..... 2008111

[52] U.S. Cl. ..... 220/306; 220/320; 215/317; 215/274; 150/.5

[51] Int. Cl. ..... B65d 41/16; B65d 45/32

[58] Field of Search..... 220/60 R, 55 AN, 306, 320; 150/.5

[56] References Cited

UNITED STATES PATENTS

| | | | |
|---|---|---|---|
| 1,713,676 | 5/1929 | Rose | 220/59 X |
| 3,216,610 | 11/1965 | Klygis | 220/60 R |
| 3,298,415 | 1/1967 | Klygis | 150/0.5 |
| 3,510,023 | 5/1970 | Ullman | 220/60 R |
| 3,531,013 | 9/1970 | Hammes | 220/60 R X |
| 3,599,826 | 8/1971 | Rocher | 220/46 R |
| 3,792,797 | 2/1974 | Mrusek et al. | 220/60 R |
| 3,805,994 | 4/1974 | Cherry et al. | 220/60 R |

*Primary Examiner*—George T. Hall
*Attorney, Agent, or Firm*—Paul L. Gardner

[57] ABSTRACT

A barrel of synthetic plastic material includes a substantially cylindrical main body portion and a head portion at one axial end and of one piece with the main body portion. The head portion has a circumferential wall having a first annular section substantially parallel with the longitudinal axis of the main body portion, a second annular section inclined inwardly at a greater angle and a third annular section projecting axially from the second section and inclined inwardly at a lesser angle. The third section has an outer free edge provided with a radially outwardly projecting circumferential bead and an inner free edge bounding an opening. A cover of synthetic plastic material overlies the head portion and comprises an outer annular rim portion of which exteriorly surrounds the head portion and has a circumferential rib abutting the second and third sections and engaging beneath the bead, and inner annular rim portion projecting into the opening proximal to the inner free edge, and a transverse portion of one piece with the inner annular rim portion spanning the opening. A sealing element is sealingly confined between and in abutment with the second annular section, the outer rim portion and the rib. At least one strap element encircles the outer rim portion and tightly urges the same into contact with the first annular section.

30 Claims, 2 Drawing Figures

CONTAINER CONSTRUCTION

Matter enclosed in heavy brackets [ ] appears in the original patent but forms no part of this reissue specification; matter printed in italics indicates the additions made by reissue.

BACKGROUND OF THE INVENTION

The present invention relates generally to containers, and more particularly to a novel container construction.

Still more particularly the present invention relates to a novel synthetic plastic barrel.

Synthetic plastic barrels are not in themselves new. It is known to provide them with an open end and with a cover which releasably closes the open end. It is also known to provide sealing means sealing the juncture between the cover and the barrel to prevent escape of contents from the barrel, and the intrusion of contaminants into it. However, the known constructions of this type have not been entirely satisfactory. Particularly, when the internal pressure became substantial, the sealing effect obtained in the prior-art construction was inadequate.

Also, the prior art provides for a recess in the outer side of the head portion of the barrel, into which recess parts of the rim of the cover are drawn in by one or more stop elements which hold the cover to the barrel. The head portion converges inwardly and axially to the open side of the barrel and this, in conjunction with the drawing-in of portions of the cover rim into the aforementioned recess, makes it difficult to obtain a proper surface-to-surface contact between the rim portion of the cover and the head portion of the barrel under the urging of the strap element, so that the undesired separation of the cover constitutes one of the most objectionable difficulties experienced in the prior-art constructions.

SUMMARY OF THE INVENTION

It is, accordingly, an object of the present invention to provide an improved container of the type under discussion.

More particularly, it is an object of the present invention to provide an improved synthetic plastic barrel with a synthetic plastic cover.

Still more specifically it is an object of the present invention to provide such an improved barrel and cover in which the cover can be secured in a simple time-saving manner to the barrel, but will nevertheless be capable of withstanding even rough handling and substantial internal pressures, without becoming dislodged and without permitting leakage.

Still a further object of the invention is to provide such a container construction in which the sealing effectiveness between cover and barrel actually increases as the internal pressure increases.

In pursuance of the above objects, and others which will become apparent hereinafter, one feature of the invention resides in a container which, according to one embodiment and briefly stated, comprises a barrel of synthetic plastic material including a substantially cylindrical main body portion having a longitudinal axis and a head portion at one axial end and of one piece with the main body portion. The head portion comprises a circumferential wall including a first annular section substantially parallel with the axis, a second annular section inclined inwardly towards the axis at a greater angle and a third annular section projecting axially from the second section and inclined inwardly towards the axis at a lesser angle, with the third section having an outer free edge provided with a radially outwardly projecting circumferential bead and an inner free edge bounding an opening communicating with the interior of the barrel.

I further provide a cover of synthetic plastic material overlying the head portion and comprising a one-piece annular rim including an outer annular rim portion exteriorly surrounding the head portion and having a circumferential rib abutting the second and third sections and engaging beneath the bead, an inner annular rim portion projecting into the opening proximal to the inner free edge, and a transverse portion of one piece with the inner annular rim portion and spanning the opening. A sealing element is sealingly confined intermediate and in abutment with the second annular section, the outer rim portion and the rib. Finally, there is provided at least one strap element which encircles the outer rim portion and tightly urges the same into contact with the first annular section.

Preferably, the transverse portion is elastically deflectable and is joined to the inner annular rim portion by a fold portion which connects the transverse portion with the inner annular rim portion along a flexible annular zone. The annular rim is substantially rigid.

By resorting to the present invention, and particularly by making the annular rim substantially rigid and the transverse portion resiliently deflectable, I assure that laterally acting forces acting upon the cover result in axial deflection of the cover without any damage to the latter. On the other hand, if the barrel for instance contains liquid or a similar material and if a sudden increase in pressure acts upon the cover at the interior due to handling of the barrel which causes the liquid to travel axially of the barrel and to crest against the inner side of the cover, the substantial rigidity of the annular rim absorbs the forces acting axially of the barrel whereas the elastically yieldable transverse portion can yield both longitudinally and transversely under such pressure. If the pressure is substantial, and the transverse portion has yielded in transverse direction to the maximum extent, then forces acting in axially outwardly directed sense act upon the juncture between the transverse portion and the annular rim of the cover, attempting to hold the rim in radially outward direction. Because of the construction according to the present invention, this is resisted by the interengaging bead and rib about which the outer annular rim portion in effect pivots so that such parts of the rim portion which are located axially adjacent to the bead and rib but on the side thereof which is remote from the opening, are displaced radially inwardly and more firmly compress the sealing element between the second annular section, the outer rim portion and the rib. The interengagement of the bead and rib has a further purpose, namely to provide an indication to a user that, as they snap one behind the other, the cover is in proper orientation with reference to the barrel.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
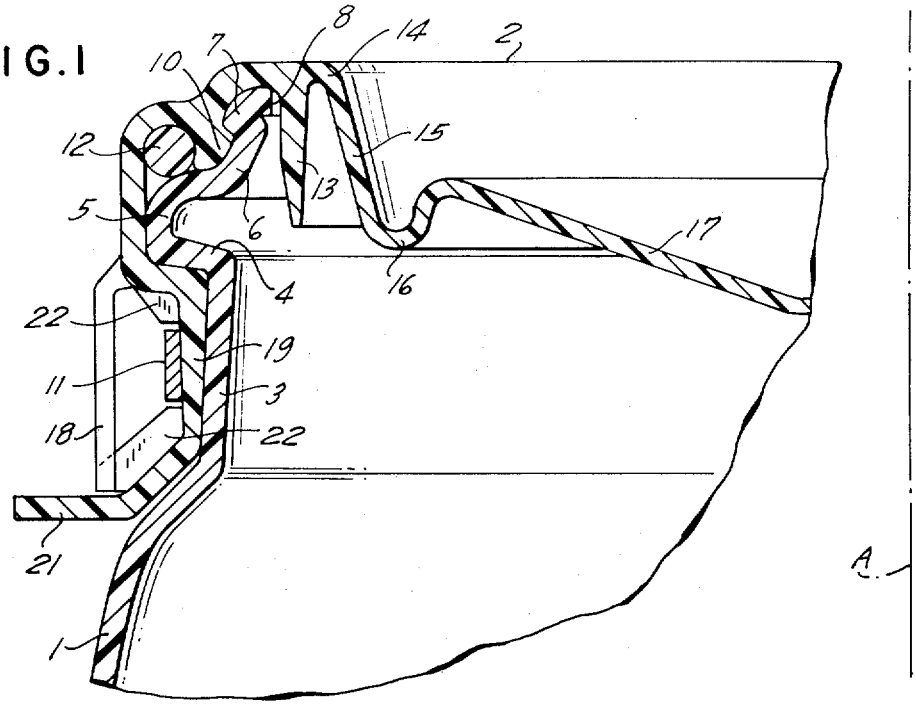
FIG. 1 is a fragmentary axial section through an embodiment of the present invention.

Discussing now the drawing in detail it is pointed out that reference numeral 1 identifies the main body portion of the barrel which is of synthetic plastic material. Essentially the main body portion 1 is substantially cylindrical. However, it will be noted that in the region of the one end which is illustrated the fragmentarily shown main body portion 1 tapers inwardly and merges into a head portion. The head portion is of one piece with the main body portion 1 and comprises a first annular section 3 which extends in substantial—although not exact—parallelism with the axis A of the barrel. At the upper axial end of the first annular section 3 there is provided a step-shaped radially outwardly extending section 4 which in turn merges at its outer free end into a second annular section 5 which is inclined radially inwardly towards the axis A at a relatively substantial angle. The free end of the section 5 then merges into a third annular section 6 which projects axially from the section 5 and which is inclined inwardly towards the axis A at a lesser angle than the section 5. The third section has a free end an outer free edge of which is provided with a radially outwardly projecting circumferential bead 7, and with an inner free edge 8 which bounds an opening communicating with the interior of the barrel.

The cover, also made of synthetic plastic material, is identified with reference numeral 1 and provided with an annular rim which is relatively rigid. The outer annular rim portion 19 of this rim is subdivided into individual segments by cut-outs or spaces 9 which are circumferentially distributed, and it overlies and surrounds the outer side of the head portion of the barrel. This is shown in FIG. 1 where it will be seen that the outer annular rim portion 19 is so configurated as to be provided with an annular depression which is matingly received in the recess defined between the inwardly converging end of the barrel 1, the section 4 and the section 3. The inner or underside of the outer annular rim portion 19 is provided with an annular rib 10 which snaps behind or beneath the bead 7, as illustrated in FIG. 1. In so doing it also abuts the sections 5 and 6 as illustrated, and between the rib 10, the section 5 and the adjacent portions of the outer annular rim portion 9 there is confined a sealing ring 12. The inner annular ring portion 13 of the cover 2 is of one piece with the outer annular rim portion 19 and extends through the opening of the head portion into the interior of the barrel, proximal to the inner free edge 8. A transverse portion 17 of the cover 2 is elastically deflectable and merges with the inner annular rim portion 13 via a fold portion 16 along the annular zone 14. The transverse portion 17 is dished in configuration, that is it is dished in direction inwardly of the interior of the barrel.

Figure 2:
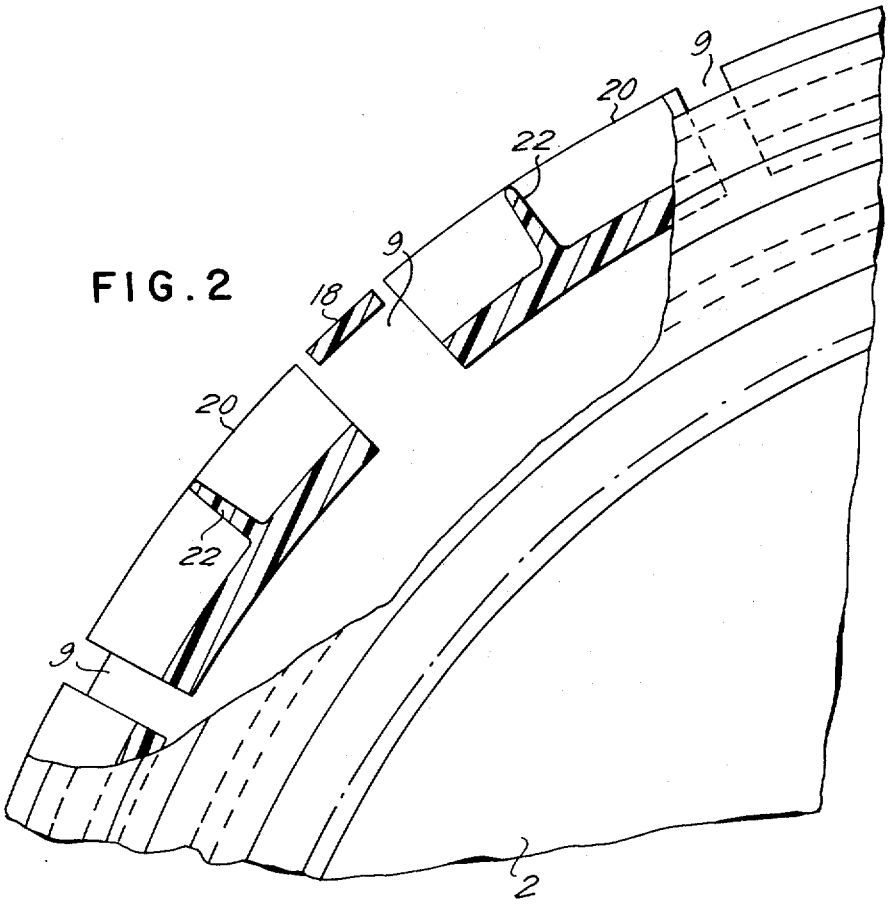
FIG. 2 is a fragmentary partially sectioned top-plan view of the embodiment in FIG. 1.

As a comparison of FIGS. 1 and 2 clearly indicates, the cover 2 is provided with a plurality of loop portions 18 which are located in the respective cut-outs 9 and which bridge the recess defined by the sections 4 and 3 and the end of the barrel 1. The lower free end portions 21 of the individual segments into which the outer annular rim portion 19 is subdivided by the cut-outs 9, extend radially outwardly, for instance at a right angle to the axis A, and the lower free end of the individual loop portions 18 is located between and inwardly of these end portions 21, as illustrated in FIG. 1. A strap element, of which one or more may be provided, encircles the outer annular rim portion 19 and the section 3 in the aforementioned recess as illustrated in FIG. 1, and is retained against becoming lost by the provision of the loop portions 18 which prevent it from falling out. Thus, the strap element 11 cannot be lost even if and at such time as the cover 2 is separated from the barrel 1, for instance prior to connecting thereto, or after it is disconnected from the barrel for cleaning purposes or the like. It is pointed out that the lower free end portions 21 need not all extend radially outwardly to the distance illustrated in FIG. 1; only some of them may extend to quite such a distance whereas others may terminate shortly outwardly of the loop portions 18.

Guide portions 22 are provided located in the recess in which the strapping element 11 is accommodated, at opposite axial sides of the latter, and have outer free edges which taper radially and axially inwardly, with these guide portions 22 defining between themselves a channel in which the strapping element 11 is located and retained against axial displacement, it being pointed out that in the absence of these portions 22 the axial length of the recess is greater than the width of the strapping element 11 seen in the same axial direction A of the barrel 1.

In conventional barrels the head portion has—seen in axial section of the barrel—a substantially S-shaped outline. This requires a relatively substantial force for drawing the outer annular rim portion of an associated cover into the thus-created recess by means of a strapping element. By contrast, the configuration chosen according to the present invention makes it possible to draw the outer annular rim portions of the cover into tight sealing engagement with the head portion of the barrel with a relatively low force, and yet for the cover to withstand even high internal pressures without becoming dislodged and without beginning to leak. The segments into which the outer annular rim portion 19 is subdivided by the cut-outs 9 have relatively long lever arms which reduces the force necessary to drawing them into tight engagement with the sections 3.

By having the strapping element 11 retained by the loop portions 18 in the manner discussed above, it becomes practially impossible for the strapping element 11 to become lost when the cover is disconnected from the remainder of the barrel. This is highly advantageous because in the known prior-art constructions the strapping elements were not in any way secured to the cover once the latter was released—which of course necessitated releasing of the strapping elements 11—so that if only a portion of the content of the barrel was to be removed and the remainder retained for later use, it was impossible to close the barrel again in the same manner as before, by utilizing the previously provided strapping elements.

Of course, the connection of the strapping elements 11 with the cover 2 by means of the loop portions 18 has a further advantage, namely that the covers can be initially provided with the strapping elements 11 and can be maintained in stock in this manner, so that it is simply necessary to pick up such a cover and place it on an associated barrel whereupon the strapping element 11 is tightened; without having to first put the strapping element in proper position as was heretofore necessary. This facilitates stocking and subsequent handling of a barrel according to the present invention.

Clearly, the proper centering and positioning of the strapping elements 11 within the recess as illustrated in FIG. 1 is assured by the provision of the guide projection 22, so that proper engagement of the strapping elements 11 with the outer annular rim portion 19, and even at equal exertion of pressure thereon when the strapping element 11 is tightened, are assured. The strapping elements may of course be strips of synthetic plastic or of metal, and they are tightened in conventional and well known manner which need not be further described herein because it presents no problems to those skilled in the art.

It will be understood that each of the elements described above, or two or more together, may also find a useful application in other types of constructions differing from the types described above.

While the invention has been illustrated and described as embodied in a container construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting various features which, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A container, comprising a barrel of synthetic plastic material including a substantially cylindrical main body portion having a longitudinal axis, and a head portion at one axial end and of one piece with said main body portion, said head portion comprising a circumferential wall including a first annular section substantially parallel with said axis, a second annular section inclined inwardly towards said axis at a greater angle and a third annular section projecting axially from said second section and inclined inwardly towards said axis at a lesser angle, said third section having an outer free edge provided with a radially outwardly projecting circumferential bead and an inner free edge bounding an opening communicating with the interior of said barrel; a cover of synthetic plastic material overlying said head portion and comprising a one-piece annular rim including an outer annular rim portion exteriorly surrounding said head portion and having a circumferential rib abutting said second and third sections and engaging beneath said bead, an inner annular rim portion projecting into said opening proximal to said inner free edge, and a transverse portion of one piece with said inner annular rim portion and spanning said opening; a sealing element sealingly confined intermediate and in abutment with said second annular section, said outer rim portion and said rib; and at least one strap element encircling said outer rim portion and tightly urging the same into contact with said first annular section.

2. A container as defined in claim 1, wherein said rim is substantially rigid and said transverse portion is elastically yieldable; and further comprising an annular fold portion connecting said transverse portion with said inner annular rim portion along a flexible annular zone.

3. A container as defined in claim 1, said outer annular rim portion being composed of a plurality of circumferentially discontinuous rim segments.

4. A container as defined in claim 1, wherein said sealing element is a sealing ring.

5. A container as defined in claim 2, said first annular section defining a circumferentially extending recess radially inwardly towards said axis, and said outer annular rim portion comprising an annular rim wall portion provided with a radially inwardly projecting inner annular step received in said recess and a corresponding outer annular depression; and wherein said strap element is located in said depression.

6. A container as defined in claim 5, and further comprising a plurality of circumferentially distributed loop portions spanning said annular depression axially thereof for retaining said strap element therein.

7. A container as defined in claim 6, said annular rim wall portion being composed of a plurality of circumferentially spaced wall segments; and wherein said loop portions are each located between two circumferentially successive ones of said wall segments.

8. A container as defined in claim 7, each of said wall segments having a free end portion facing towards said main body portion and extending radially outwardly from said axis; and wherein said loop portions each have a connected end fast with said outer annular rim portion and a free end located intermediate and radially inwardly of said free end portions of the respectively adjacent wall segments.

9. A container as defined in claim 5, said outer annular depression having in direction of said axis a length which is greater than the width of said strap element in said direction; and retaining means retaining said strap element substantially midway in said depression.

10. A container as defined in claim 9, said retaining means comprising projections in said depression at opposite axial ends thereof and having outer edges converging in direction radially inwardly as well as axially of said depression, said projections defining substantially midway of said depression a channel in which said strap element is confined.

*11. A container, comprising:*

*a synthetic plastic barrel comprising:*

*a substantially cylindrical main body portion having a longitudinal axis, and a head portion integrally connected to one end of said main body portion; said head portion comprising a circumferential wall including a first annular section substantially parallel with said longitudinal axis, a second annular section inclined inwardly towards said longitudinal axis and a third annular section projecting generally axially from said second section; said third section having an outer free edge provided with a radially outwardly projecting circumferential bead and an inner free*

*edge bounding an opening communicating with the interior of said barrel;*

*a cover of synthetic plastic material overlying said head portion of said barrel and comprising an integral annular rim including an annular outer rim portion exteriorly surrounding said head portion of said barrel and having a circumferential rib abutting said circumferential bead on said outer free edge of said third annular section of said barrel; said integral rim further comprising an annular inner rim portion projecting into said opening proximal to said inner free edge of said third annular section of said barrel, and a transverse portion integral with said annular inner rim portion and spanning said opening of said barrel;*

*a sealing element sealingly confined intermediate and in abutment with said head portion of said barrel and said outer rim portion of said cover; and*

*a strap element encircling said annular outer rim portion of said cover tightly urging the same into contact with said first annular section of said barrel.*

*12. A container as defined in claim 11, wherein said rim is substantially rigid and said transverse portion is elastically yieldable; and further comprising an annular fold portion connecting said transverse portion with said inner rim portion along a flexible annular zone.*

*13. A container as defined in claim 11, said annular outer rim portion comprising a plurality of circumferentially discontinuous rim segments.*

*14. A container as defined in claim 11, wherein said sealing element is a sealing ring.*

*15. A container as defined in claim 12, wherein said first annular section of said barrel has a diameter smaller than the diameter of said main body portion and smaller than the diameter of said second annular section to thereby define a circumferential recess extending radially inwardly towards said axis; and wherein said outer annular rim portion of said cover comprises a radially inwardly recessed wall portion which is received in said circumferential recess in said first annular section; and wherein said strap element is located in said recessed wall portion of said cover.*

*16. A container as defined in claim 15, and further comprising a plurality of circumferentially-spaced loop portions spanning said recessed wall portion of said cover, axially thereof, for retaining said strap element therein.*

*17. A container as defined in claim 16, said outer annular rim portion including a plurality of circumferentially-spaced wall segments; and wherein each of said loop portions is located between two circumferentially successive ones of said wall segments.*

*18. A container as defined in claim 17, each of said wall segments having a free end portion extending radially outwardly from said axis; and wherein each of said loop portions have a connected end connected to said outer annular rim portion and a free end located intermediate and radially inwardly of the free end portions of the respectively adjacent wall segments.*

*19. A container as defined in claim 15, said radially inwardly recessed wall portion of said cover having, in an axial direction, a length which is greater than the width of said strap element in said direction; and retaining means retaining said strap element substantially midway in said recessed wall portion.*

*20. A container as defined in claim 19, said retaining means comprising projections in said recessed wall portion at opposite axial ends thereof and having outer edges converging in a radially inward direction and also converging in an axial direction; said projections defining, substantially midway of said recessed wall portion, a channel in which said strap element is confined.*

*21. A container, comprising:*

*a synthetic plastic barrel comprising:*

*a substantially cylindrical main body portion having a longitudinal axis, and a head portion integrally connected to one end of said main body portion; said head portion comprising a circumferential wall including a first annular section substantially parallel with said longitudinal axis, a second annular section inclined inwardly towards said longitudinal axis and a third annular section projecting generally axially from said second section; said third section having an outer free edge provided with a radially outwardly projecting circumferential bead and an inner free edge bounding an opening communicating with the interior of said barrel; said first annular section having a diameter smaller than the diameter of said main body portion and smaller than the diameter of said second section to thereby define a circumferential recess extending radially inwardly towards said longitudinal axis;*

*a synthetic plastic cover overlying said head portion and comprising a substantially rigid, integral annular rim including an outer annular rim portion exteriorly surrounding said head portion of said barrel and having a circumferential rib abutting said circumferential bead on said outer free edge of said third annular section; said outer annular rim portion comprising a plurality of circumferentially-spaced wall segments, each of said wall segments having a free end portion extending radially outwardly relative to said longitudinal axis; said integral annular rim further comprising an inner annular rim portion projecting into said opening proximal to said inner free edge of said third annular section of said barrel; said cover further including an elastically yieldable transverse portion integral with said inner annular rim portion and spanning said opening; said outer annular rim portion of said cover including a radially inwardly recessed wall portion which is received in said circumferential recess in said first annular section of said barrel;*

*a strap element disposed in said radially inwardly recessed wall portion of said cover and tightly urging said wall portion in contact with said first annular section of said head portion of said barrel;*

*a plurality of circumferentially-spaced loop members substantially spanning said recessed wall portion of said cover in an axial direction for retaining said strap element therein; each of said loop members including a connected end connected to said outer annular rim portion and a free end; and*

*a sealing element sealingly confined intermediate and in abutment with said head portion of said barrel and said outer rim portion of said cover.*

*22. A container as defined in claim 21, and further comprising an annular fold portion connecting said transverse portion of said cover with said annular inner rim portion of said cover along a flexible annular zone.*

*23. A plastic container having an opening and having a plastic closure for closing the opening, the container having a body portion and a portion leading to the opening which has the following external surface configura-*

*tions, in succession, going from the body portion to the opening:*

*a first neck whose outer surface is substantially parallel to the axis of the opening;*

*a radially outwardly extending portion whose surface adjacent the first neck extends at approximately a right angle to the axis of the opening and which terminates in an inwardly-extending surface;*

*a second neck; and*

*a bead projecting outwardly beyond the adjacent portion of the second neck;*

*the closure having a relatively flexible center portion surrounded by a relatively rigid edge and skirt portion, the edge and skirt portion including the following parts, going from the container body portion towards the container opening when the closure is in position closing the container opening;*

*securing members around the edge portion of the closure, divided from one another, the securing members being relatively rigid and having an internal configuration which conforms with the container first neck and the adjacent surface of said container projection; the securing members being arranged to be secured to the first neck by means of a clamping member passing around the exterior of the securing members, in order to secure the closure on the container;*

*a skirt portion to which the securing members are attached;*

*a relatively rigid projection on the inside of the closure and having an internal configuration which conforms with the container second neck and engages behind the container bead when the closure is in position closing the container opening; and*

*a sealing ring retained between said closure projection and the internal surface of the closure skirt portion so as to be pressed against the inwardly-extending surface of said radially outwardly extending portion of the container when the clamping member clamps the securing members.*

*24. A container and closure as claimed in claim 23, wherein the closure includes a flange extending approximately parallel to the container opening axis so as to lie just radially within the edge of the container opening when the closure is in position closing the container opening.*

*25. A container and closure as claimed in claim 23, wherein the center portion of the closure has an annular trough positioned so as to lie radially within the edge of the container opening, the trough surrounding a central concave part, and the center portion being of reduced thickness compared to the securing members and said closure projection so as to be flexible.*

*26. A container and closure as claimed in claim 23, wherein the closure has retaining members which are spaced radially outwardly of the securing members and are arranged so that a loose clamping member passing between the retaining members and the securing members is retained on the closure.*

*27. A container and closure as claimed in claim 26, wherein the securing members have outwardly-directed flanges on their edges remote from the container opening, and the retaining members extend approximately parallel to the securing members and the respective ends of the retaining members are closely adjacent the flanges on the securing members.*

*28. A container and closure as claimed in claim 27, wherein circumferentially, the retaining members lie between adjacent pairs of the securing members, and the respective ends of the retaining members terminate closely adjacent to the gaps between respective flanges on the securing members.*

*29. A container and closure as claimed in claim 23, wherein the first container neck and securing members have a greater length, as measured in the direction of the opening axis, than the width, as measured in the direction of the opening axis, of the clamping member, the securing members having a clamping zone of greater length than the width of the clamping member, and guide webs being provided adjacent the clamping zone, projecting radially outwardly from the securing members and having guide surfaces inclined toward the opening axis for guiding the clamping member into the clamping zone when the clamping member is tightened.*

*30. A container and closure as claimed in claim 29, wherein there are said guide webs both on the side of the clamping zone nearer the opening and on the other side of the clamping zone.*

* * * * *